(12) United States Patent
Amamiya et al.

(10) Patent No.: US 7,087,890 B2
(45) Date of Patent: Aug. 8, 2006

(54) ROTATING-BODY CONTROL DEVICE

(75) Inventors: Sumiko Amamiya, Okazaki (JP);
Tatsuya Ozeki, Torrance, CA (US);
Shigeru Kamio, Nagoya (JP); Yasuhiro Nakai, Kariya (JP); Kazuo Kawaguchi, Kasugai (JP); Yasuo Shimizu, Toki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 10/815,681

(22) Filed: Apr. 2, 2004

(65) Prior Publication Data

US 2004/0195496 A1    Oct. 7, 2004

(30) Foreign Application Priority Data

Apr. 4, 2003    (JP)    ............... 2003-101981

(51) Int. Cl.
*H03D 3/00*    (2006.01)
(52) U.S. Cl. ............... 250/231.14; 327/2; 327/227
(58) Field of Classification Search ............... 250/231.13–231.18; 327/2, 207, 208, 227, 233; 318/656
See application file for complete search history.

(56) References Cited

U.S. PATENT DOCUMENTS

2004/0119506 A1*    6/2004    Ioi ............... 327/2

FOREIGN PATENT DOCUMENTS

| JP | 1-140113 | 9/1989 |
| JP | 5-294587 | 11/1993 |
| JP | 11-64040 | 3/1999 |

* cited by examiner

*Primary Examiner*—Thanh X. Luu
*Assistant Examiner*—Tony Ko
(74) *Attorney, Agent, or Firm*—Oblon, Spivak, McClelland, Maier & Neustadt, P.C.

(57) ABSTRACT

A P-ECU controls an actuator which drives a shift control mechanism. An encoder signal acquisition unit acquires signals output from an encoder which detects a rotational angle of the actuator. A counter calculates a count value from the output signals of the encoder. An energization control unit controls energization to the actuator. A first phase-matching unit uses the Z-phase signal of the encoder to match the count value with energized phases so as to find a correspondence therebetween and a second phase-matching unit matches the count value with energized phases to find a correspondence therebetween without using the Z-phase signal of the encoder. If the first phase-matching unit detects an abnormality of the encoder, the second phase-matching unit subsequently performs phase matching.

14 Claims, 6 Drawing Sheets

ROTATING-BODY CONTROL DEVICE

This nonprovisional application is based on Japanese Patent Application No. 2003-101981 filed with the Japan Patent Office on Apr. 4, 2003, the entire contents of which are hereby incorporated by reference.

BACKGROUND OF THE INVENTION

1. Field of the Invention

The present invention relates to a technique of controlling a rotating body. In particular, the invention relates to a technique of calibrating an encoder for detecting a rotational state of the rotating body as well as a technique of detecting an abnormality of the encoder.

2. Description of the Background Art

An optical rotary encoder for detecting a rotational displacement of a rotating body has been proposed. This encoder has a disk-shaped scale provided on the rotational axis of the rotating body. The scale has a plurality of slits along its periphery. Light-emitting devices and light-receiving devices corresponding to the A phase and B phase having a 90-degree phase difference therebetween as well as the Z phase serving as an origin signal which is output once per revolution are arranged with the scale therebetween. Using A, B and Z-phase signals of the encoder, a rotational angle and a rotational direction of the rotating body can be obtained (see Japanese Patent Laying-Open No. 11-64040).

Japanese Patent Laying-Open No. 11-64040 also discloses a technique of detecting an abnormality of the encoder that is found when a rotational direction of the rotating body that is determined based on the A-phase and B-phase signals changes regardless of the fact that the encoder is continuously rotated in the same direction.

Since the encoder disclosed in Japanese Patent Laying-Open No. 11-64040 cannot detect an absolute angle of the rotating body, the need arises for any method of finding a correlation between output signals and a rotational angle of the rotating body. If calibration is to be done using the Z-phase signal which is the origin signal, the calibration fails if an abnormality occurs in the Z-phase signal and consequently the rotating body cannot be controlled.

Although the method proposed in Japanese Patent Laying-Open No. 11-64040 can detect any abnormality in phase relation between the A-phase signal and the B-phase signal, it cannot detect other abnormalities.

In order to appropriately control the rotating body, a technique is required of more correctly detecting the state of the encoder to accurately know the state of the rotating body based on output signals of the encoder.

SUMMARY OF THE INVENTION

An object of the present invention is to provide a technique of appropriately controlling a rotating body.

According to an aspect of the present invention, a rotating-body control device includes a first phase-matching unit of Z-phase detection type successively energizing each of a plurality of phases of a rotating body which is driven through energization and resultant excitation of those phases, for obtaining, when a Z-phase output of an encoder detecting a rotational angle of the rotating body is rendered ON, a correspondence between a count value calculated from an output signal of the encoder and energized phases, and a second phase-matching unit of Z-phase non-detection type successively energizing, when an abnormality in encoder output is detected under control by the first phase-matching unit, each of the phases for a period of time in which the rotating body can follow change of energized phases, for obtaining, when final energization is done, a correspondence between a count value calculated from an output signal of the encoder and energized phases.

With the rotating-body control device of this aspect, when an abnormality is detected that makes it impossible to perform phase-matching by the first phase-matching unit of Z-phase detection type, the second phase-matching unit of Z-phase non-detection type can be used to retry the phase matching in another way. Accordingly, without additional encoder, the phase matching can be accomplished.

The first phase-matching unit and the second phase-matching unit may determine that an abnormality occurs in the rotating body or the encoder if an amount of change of the count value when the rotating body is being rotated is less than a predetermined threshold value.

The rotating-body control device according to another aspect may further include an abnormality detecting unit for determining that an abnormality occurs in the rotating body or the encoder if an amount of change of a count value calculated from an output signal of the encoder detecting a rotational angle of the rotating body is less than a predetermined threshold value when the rotating body is being rotated.

The rotating-body control device of this aspect can accurately detect an abnormality in output signals of the encoder or a rotational malfunction of the encoder.

The amount of change may be a difference between a count value when rotation of the rotating body starts and a count value when the rotation of the rotating body ends. Accordingly, it can appropriately be determined whether or not the count value indicating a rotational amount from the start to the end of the rotation reaches the predetermined threshold value. Alternatively, the amount of change may be a difference between a maximum value and a minimum value of the count value when the rotating body is rotating. Accordingly, it can appropriately be determined whether or not the count value indicting a maximum displacement when the rotating body is rotating reaches the predetermined threshold.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
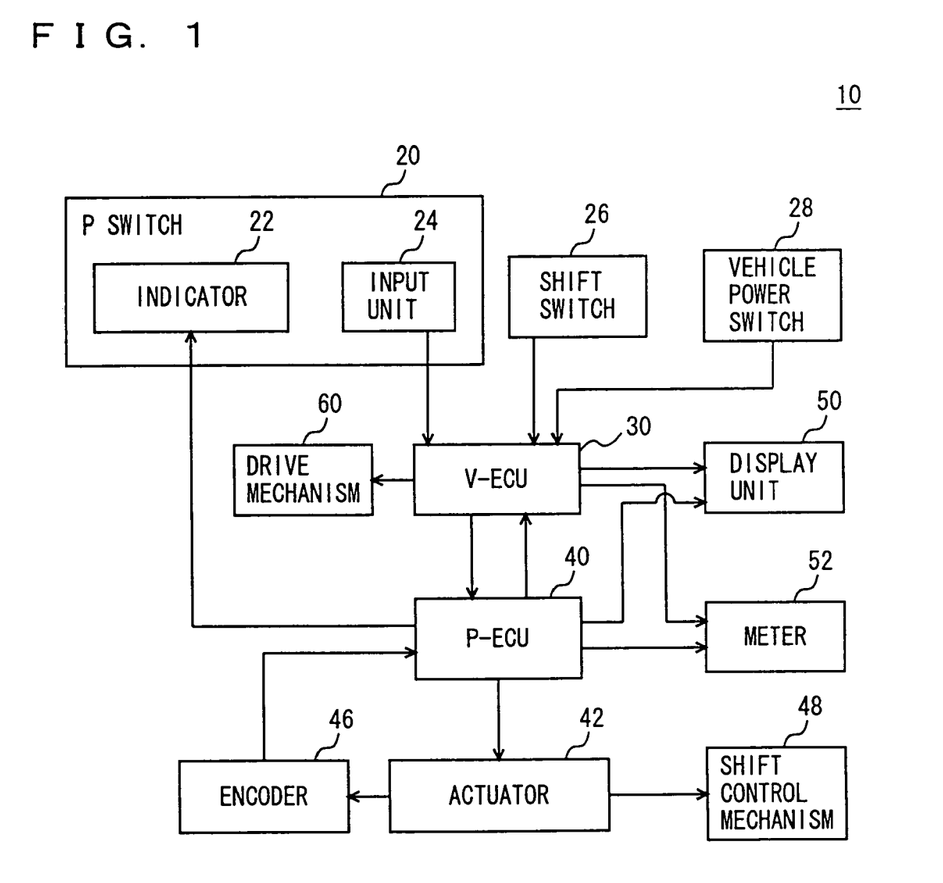
FIG. 1 shows a configuration of a shift control system according to an embodiment of the present invention.

FIG. 1 shows a configuration of a shift control system 10 according to an embodiment of the present invention. Shift control system 10 of this embodiment is used for switching a shift range of a vehicle. Shift control system 10 includes a P switch 20, a shift switch 26, a vehicle power switch 28, a vehicle control unit (hereinafter referred to as "V-ECU")

30, a parking control unit (hereinafter "P-ECU") 40, an actuator 42, an encoder 46, a shift control mechanism 48, a display unit 50, a meter 52, and a drive mechanism 60. Shift control system 10 functions as a shift-by-wire system which switches the shift range under electrical control. Specifically, shift control mechanism 48 is driven by actuator 42 to switch the shift range.

Vehicle power switch 28 is a switch for turning on and turning off the electric power supply of the vehicle. An instruction from a user, a driver for example, that is received by vehicle power switch 28 is transmitted to V-ECU 30. For example, in response to turning-on of vehicle power switch 28, electric power is supplied from a battery (not shown) to operate shift control system 10.

P switch 20 is used to change the shift range between the parking range (hereinafter "P range") and any range except for the parking range (hereinafter "non-P range") and includes an indicator 22 for showing a state of the switch to the driver as well as an input unit 24 for receiving an instruction from the driver. The driver inputs through input unit 24 an instruction to switch the shift range to the P range. Input unit 24 may be a momentary switch for example. The instruction received by input unit 24 is transmitted to V-ECU 30 and to P-ECU 40 through V-ECU 30.

P-ECU 40, which is an example of rotating-body control devices, controls operation of actuator 42 which drives shift control mechanism 48 in order to change the shift range between the P range and the non-P range, and shows a current state of the shift range on indicator 22. If the driver presses input unit 24 when the shift range is the non-P range, P-ECU 40 switches the shift range to the P range and then shows that the current shift range is the P range on indicator 22.

Actuator 42 is constructed of a switched reluctance motor (hereinafter "SR motor") and drives shift control mechanism 48 in response to an instruction from P-ECU 40. Encoder 46 rotates together with actuator 42 to detect a rotational state of the SR motor. Encoder 46 of this embodiment is a rotary encoder which outputs A-phase, B-phase and Z-phase signals. P-ECU 40 receives signals that are output from encoder 46 to know a rotational state of the SR motor and thereby control energization for driving the SR motor.

Shift switch 26 is a switch used for switching the shift range to the drive range (D), the reverse range (R), the neutral range (N) and the brake range (B) for example or canceling the P range when the P range is selected. An instruction from the driver that is received by shift switch 26 is transmitted to V-ECU 30. Based on the instruction from the driver, V-ECU 30 controls drive mechanism 60 to change the shift range and shows the current state of the shift range on meter 52. Although drive mechanism 60 here is constructed of a continuously-variable transmission mechanism, the drive mechanism may be constructed of an automatic gearbox transmission mechanism.

V-ECU 30 entirely controls operation of shift control system 10. Display unit 50 indicates instructions and warnings for example to the driver that are issued by V-ECU 30 or P-ECU 40. Meter 52 indicates a state of equipment of the vehicle and a state of the shift range.

Figure 2:
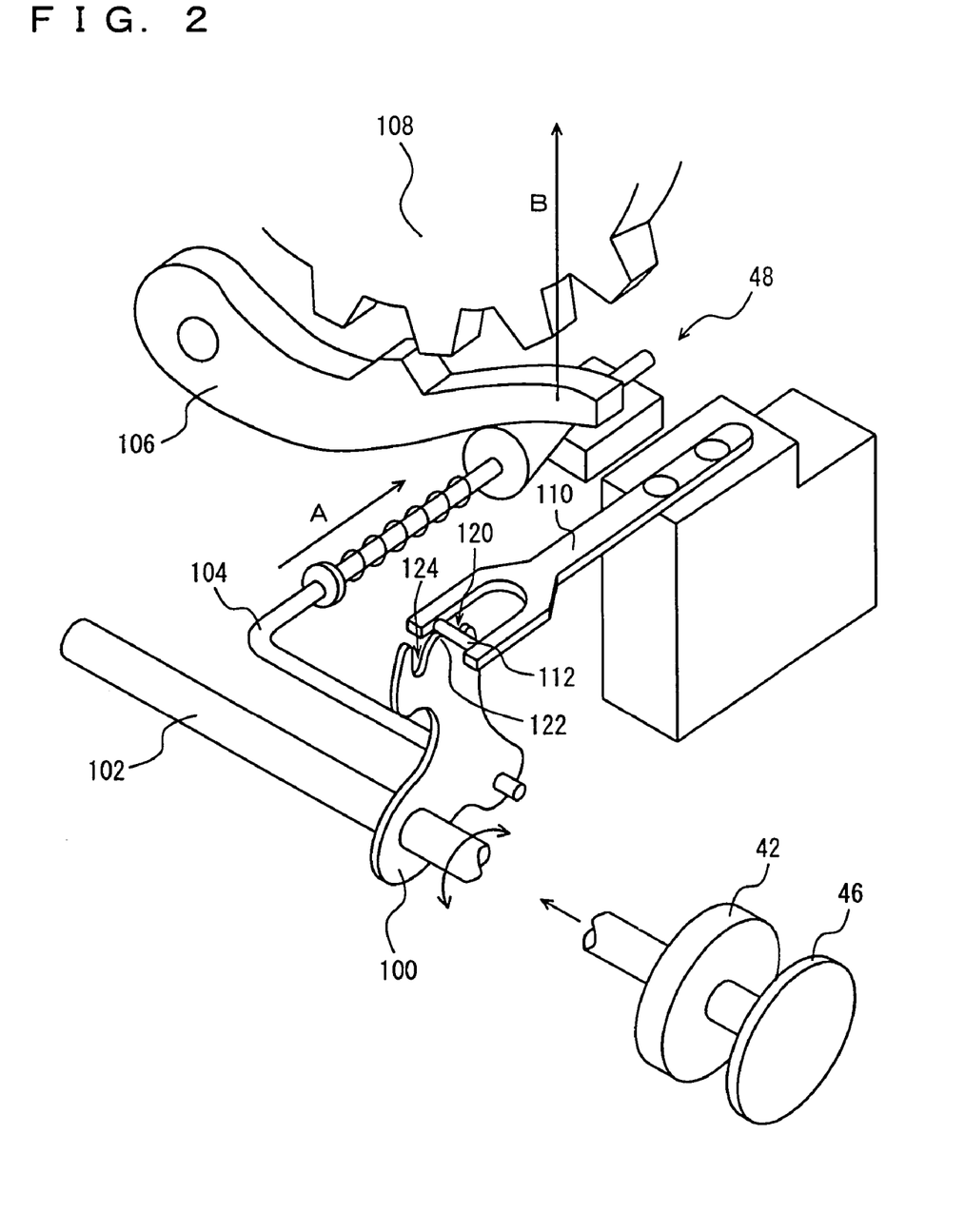
FIG. 2 shows a configuration of a shift control mechanism.

FIG. 2 shows a configuration of shift control mechanism 48. Shift control mechanism 48 includes a shaft 102 rotated by actuator 42, a detent plate 100 rotating according to the rotation of shaft 102, a rod 104 sliding according to the rotation of detent plate 100, a parking gear 108 fixed to an output shaft of a transmission (not shown), a parking lock pole 106 for locking parking gear 108, and a detent spring 110 and a roller 112 restricting the rotation of detent plate 100 to fix the shift range.

FIG. 2 shows a state of the shift range which is now the non-P range. In this state, as parking lock pole 106 does not lock parking gear 108, rotations of the drive shaft of the vehicle cannot be prevented. Starting from this state, actuator 42 rotates shaft 102 in the clockwise direction in FIG. 2 so that rod 104 is pushed via detent plate 100 in the direction indicated by the arrow A in FIG. 2 and parking lock pole 106 is accordingly pushed up by a tapered portion on an end of rod 104 in the direction indicated by the arrow B in FIG. 2. As detent plate 100 rotates, roller 112 of detent spring 110 that is located in one of depressions on the top of detent plate 100, namely located at a non-P range position 120, climbs over a crest 122 and then down into the other depression, namely a P range position 124. When detent plate 100 rotates to such a degree that allows roller 112 to move to P range position 124, parking lock pole 106 is pushed up to a position where pole 106 engages with parking gear 108. In this way, the drive shaft of the vehicle is mechanically fixed and the shift range is switched to the P range.

Figure 3:
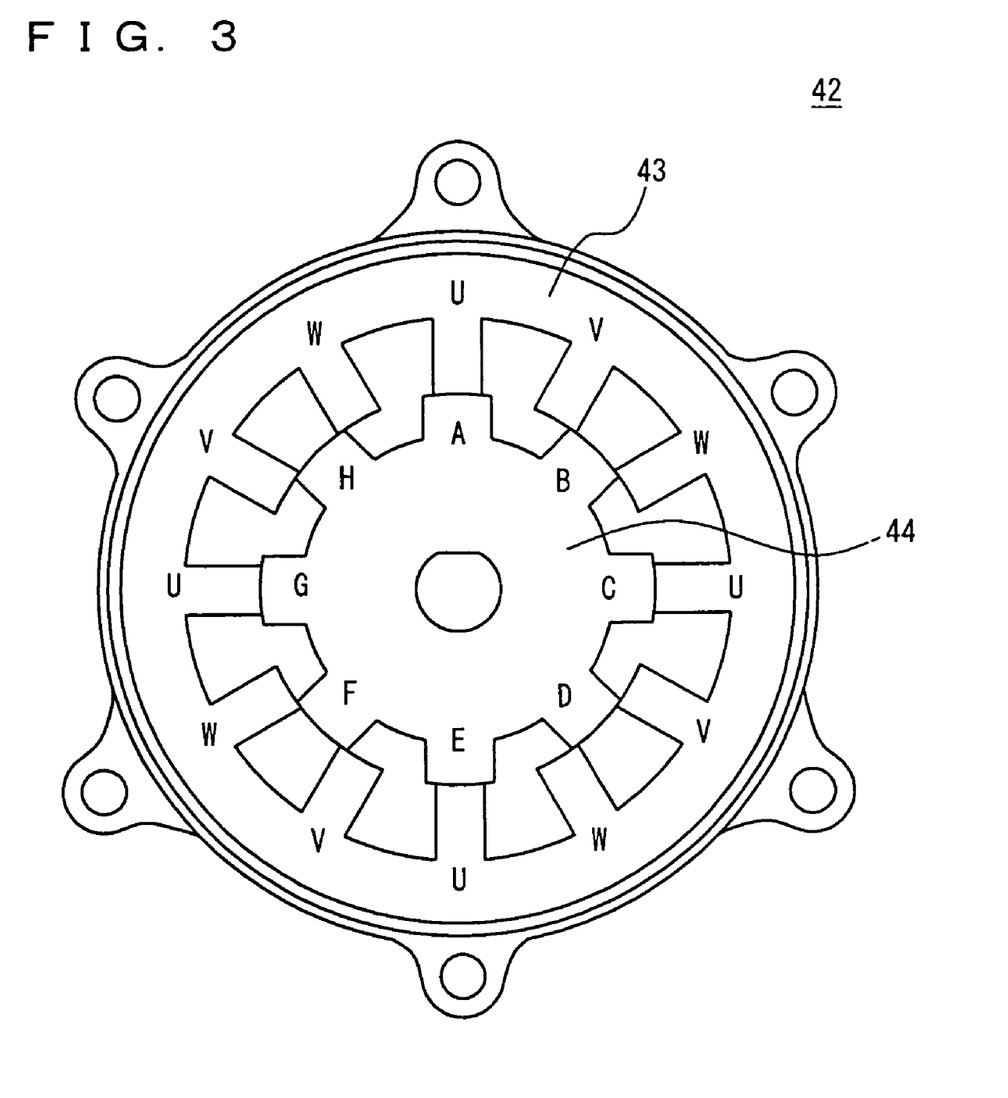
FIG. 3 shows a cross section of an actuator.

FIG. 3 shows a cross section of actuator 42. The SR motor constituting actuator 42 includes a stator 43 and a rotor 44 both constructed to have salient poles. In the SR motor, windings coiled around salient poles of fixedly provided outer stator 43 are energized and thereby excited to cause inner rotor 44 to rotate. The SR motor shown in FIG. 3 has three-phase stator 43 with twelve salient poles and rotor 44 with eight salient poles. In the state shown in FIG. 3, the U phase of stator 43 is energized so that salient poles A, C, E and G of rotor 44 are attracted toward salient poles U of stator 43. At this time, however, the magnetic resistance is at its minimum and thus the attracting force occurs in the radial direction only to cause no torque. In other words, rotor 44 is stopped by stator 43.

Then, the energization is changed in a manner that the U phase and the V phase are then energized, so that the salient poles A, C, E and G of rotor 44 are attracted toward salient poles V of stator 43 and accordingly rotor 44 rotates in the clockwise direction. Further, when rotor 44 rotates to allow the salient poles A, C, E and G thereof to reach the intermediate position each between the salient poles U and V of stator 43, the energization is changed in a manner that the V phase of stator 43 is then energized, so that the salient poles A, C, E and G of rotor 44 are attracted by the salient poles V of stator 43 to further rotate rotor 44 in the clockwise direction. In this way, the SR motor successively changes the energization in such a manner that respective coils of salient poles of stator 43 where corresponding salient poles of rotor 44 are approaching are energized, so as to rotate rotor 44. For example, it is supposed here that the state shown in FIG. 3 is a reference position. Then, rotor 44 may be rotated in the clockwise direction starting from the reference position by the change of energized phases in the following order: U and V phases, V phase, V and W phases, W phase, W and U phases, and U phase. Alternatively, rotor 44 may be rotated in the anticlockwise direction starting from the reference position by the change of energized phases in the following order: U and W phases, W phase, W and V phases, V phase, V and U phases, and U phase.

The energization to each phase of actuator 42 is controlled by P-ECU 40 shown in FIG. 1. In order that P-ECU 40 may appropriately control actuator 42, it is necessary to know a rotational angle of rotor 44. A sensor capable of detecting an absolute angle, however, is expensive. Therefore, this embodiment, in view of the production cost, uses rotary encoder 46 of incremental type that is provided to rotate together with rotor 44, for obtaining the rotational angle of rotor 44. P-ECU 40 receives output signals of encoder 46 to know the rotational angle of rotor 44 based on the signals. In this case, the rotational angle of encoder 46 is unknown when shift control system 10 is started to operate. Therefore, P-ECU 40 is required to know in advance a correspondence between a count value calculated from an output signal of encoder 46 and energized phases for driving actuator 42. Accordingly, immediately after shift control system 10 is started to operate, P-ECU 40 acquires the correspondence between the count value calculated from the output signal of encoder 46 and the energized phases for driving actuator 42 to perform initial drive control for matching the rotation of rotor 44 with the energized phases.

Even if a memory for example holds, when shift control system 10 is started to operate, the above-described correspondence under preceding control, the rotational angle of encoder 46 and rotor 44 could be different from that at the end of the preceding control, for the reason that detent plate 100 rotates to a stable position during the power-off period, or that any displacement for example within actuator 42 or at the portion where actuator 42 is fitted with shift control mechanism 48 occurs to cause rotor 44 to rotate. This embodiment thus exercises the initial drive control each time shift control system 10 is started to operate.

Figure 4:
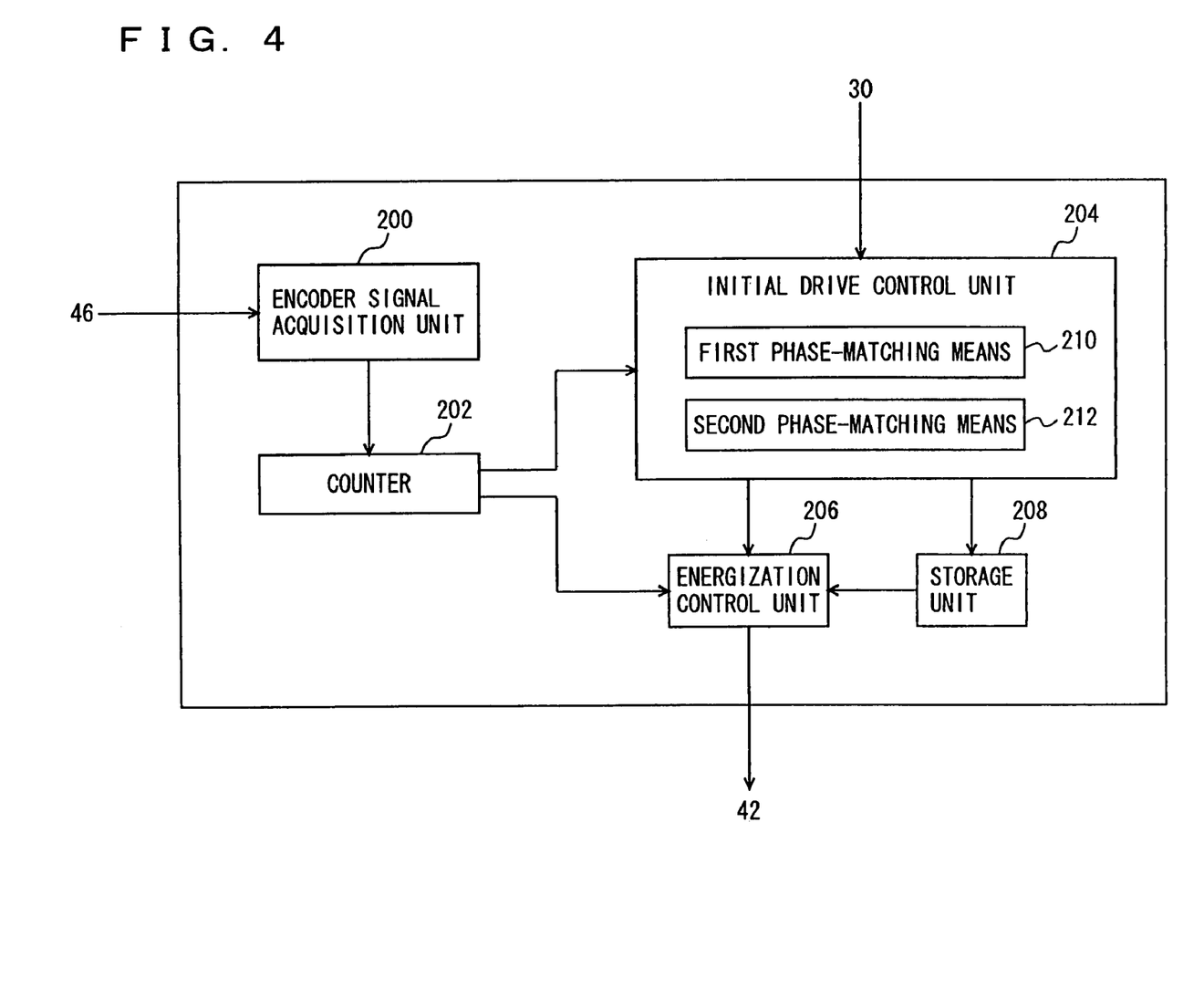
FIG. 4 shows an internal configuration of a P-ECU.

FIG. 4 shows an internal configuration of P-ECU 40. P-ECU 40 includes an encoder signal acquisition unit 200, a counter 202, an initial drive control unit 204, an energization control unit 206, and a storage unit 208. Initial drive control unit 204 includes first phase-matching means 210 as an example of phase-matching means of Z-phase detection type as well as second phase-matching means 212 as an example of phase-matching means of Z-phase non-detection type. This configuration may be implemented by such hardware as a CPU, memory or LSI or such software as a program loaded in a memory.

Encoder signal acquisition unit 200 acquires A-phase, B-phase and Z-phase signals that are output from encoder 46. Counter 202 counts the number of pulses of the A-phase and B-phase signals of encoder 46 obtained by encoder signal acquisition unit 200. Counter 202 determines a rotational direction of encoder 46 from the phases of the A-phase and B-phase signals. When counter 202 detects rises and falls of the A-phase and B-phase signals, it increments its count value if encoder 46 rotates in a forward direction while it decrements its count value if encoder 46 rotates in the opposite direction.

Initial drive control unit 204 performs the initial drive control for obtaining a correspondence between the count value calculated by counter 202 and energized phases for driving actuator 42. First phase-matching means 210 exercises first initial drive control for doing phase-matching on the basis of the Z-phase signal output from encoder 46, and second phase-matching means 212 exercises second initial drive control for doing phase-matching without the Z-phase signal of encoder 46. Respective methods for these initial drive controls are described in detail hereinlater. First phase-matching means 210 and second phase-matching means 212 detect an abnormality of encoder 46 when the initial drive control is done. In other words, first phase-matching means 210 and second phase-matching means 212 each have the function of abnormality detecting means. Initial drive control unit 204 determines, when shift control system 10 is started to operate, which of the first initial drive and the second initial drive is to be done and accordingly instructs first phase-matching means 210 or second phase-matching means 212 to exercise its initial drive control. Energization control unit 206 controls energization to each phase to be energized of actuator 42. Storage unit 208 holds information necessary for the control by P-ECU 40.

Figure 5:
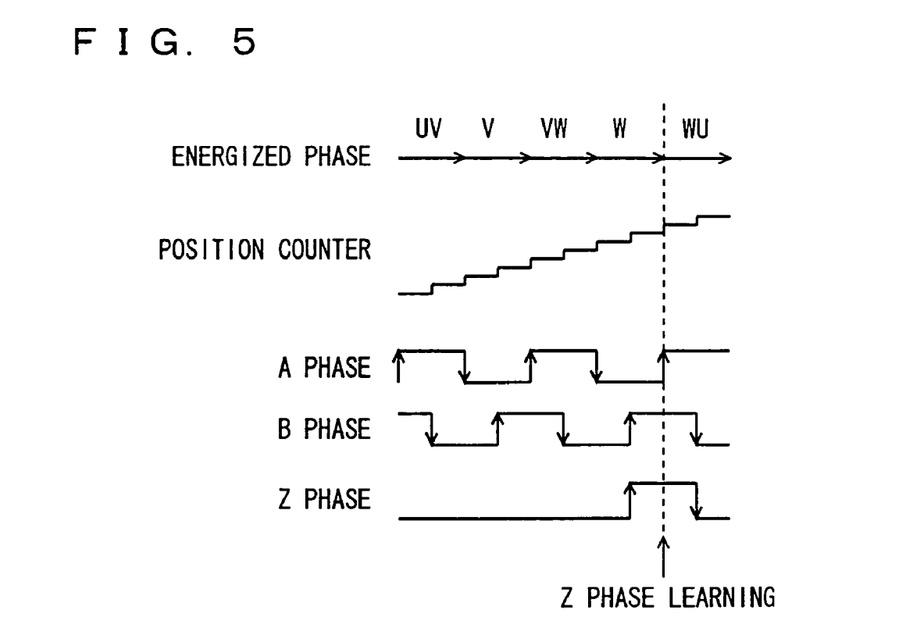
FIG. 5 illustrates a method for first initial drive control by first phase-matching means.

FIG. 5 illustrates a method for the first initial drive control by first phase-matching means 210. At the start of the initial drive control, P-ECU 40 does not know the rotational angle of rotor 44 and thus it cannot determine which phase can be energized to rotate rotor 44. Therefore, first phase-matching means 210 instructs energization control unit 206 to do energization in a manner that energized phases are changed at predetermined intervals. For example, referring to FIG. 5, energization is done in the order of U and V phases, V phase, V and W phases, W phase, and W and U phases. If rotor 44 is not fixed, rotor 44 follows the change of energized phases to start rotating at a certain time. When encoder signal acquisition unit 200 obtains the Z-phase signal which is an origin signal of encoder 46, first phase-matching means 210 stores in storage unit 208 a correspondence at this time between the count value of counter 202 and the energized phases. After this, P-ECU 40 can use this correspondence to exercise optimum energization control for rotating rotor 44.

First phase-matching means 210 performs, as the first initial drive control, energization control for rotating encoder 46 by an angle corresponding to one output of the Z-phase signal from encoder 46. For example, if encoder 46 is configured to output the Z-phase signal once per revolution, it would be enough to effect one rotation of encoder 46. If encoder 46 outputs the Z-phase signal eight times per revolution, i.e., once per rotation of 45 degrees, it would be enough to effect rotation of encoder 46 by 45 degrees. If encoder signal acquisition unit 200 cannot acquire the Z-phase signal in this period in which encoder 46 is rotated by an appropriate angle, initial drive control unit 204 provisionally determines that there is an abnormality in the Z-phase signal output of encoder 46 and sets a provisional Z-phase fail flag at storage unit 208 to proceed to the second initial drive control hereinlater described in detail.

Under the first initial drive control, if an amount of change of the count value is less than a predetermined threshold value, it is possible that any abnormality occurs in the A-phase or B-phase signal output of encoder 46, or a rotational malfunction of encoder 46 occurs. At this time, initial drive control unit 204 sets a provisional AB-phase fail flag at storage unit 208 and proceeds to the second initial drive control hereinlater described. The provisional AB-phase fail herein includes the rotational malfunction of encoder 46. As the amount of change of the count value, a difference between a maximum value and a minimum value of the count value under the first initial drive control may be employed (A), or a difference between the count value at the start and the count value at the end of the first initial drive control may be employed (B). When the first initial drive control is started, it could occur that encoder 46 rotates in the direction opposite to the rotational direction in which first phase-matching means 210 intends to drive. Therefore, it seems that the former difference (A) more correctly reflects the actual rotational amount. On the other hand, in terms of process simplicity, the latter difference (B) is more advantageous. The threshold value is set according to an expected amount of change to be observed as encoder 46 rotates under the first initial drive control. The threshold value may be set to the one smaller than the expected amount of change in consideration of the fact that, immediately after the first initial drive control is started, encoder 46 could not follow the change of energized phases or encoder 46 could rotate in the opposite direction.

In this embodiment, since actuator 42 is provided for changing the shift range by shift control mechanism 48, it is particularly important to accurately detect a rotational malfunction or a state where rotation cannot be accomplished. Accordingly, the state where an amount of change of the count value does not exceed a predetermined threshold value is regarded as an abnormality. Further, an abnormality is detected, not by continuously monitoring an amount of change of the count value for a predetermined period of time, but by comparing an amount of change of the count value within a set period of time under the initial drive control with the threshold value which is set according to an expected amount of change of the count value. Thus, any abnormality can immediately and accurately be detected.

Figure 6:
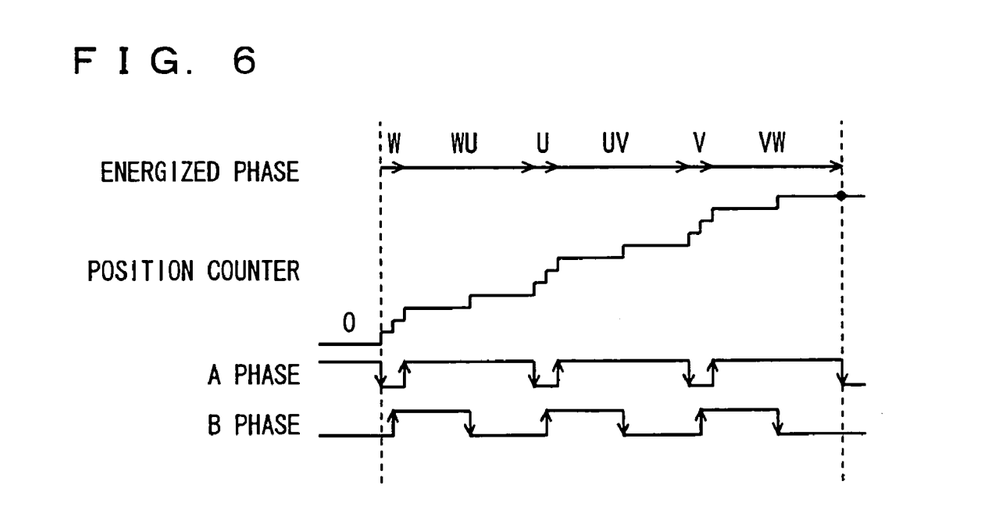
FIG. 6 illustrates a method for second initial drive control by second phase-matching means.

FIG. 6 illustrates a method for the second initial drive control by second phase-matching means 212. Under the second initial drive control, energization is continued for a longer period of time as compared with the first initial drive control in order to ensure that rotor 44 follows the change of energized phases. The energization time period is for example approximately 24 milliseconds per step for the first initial drive control. For the second initial drive control, the energization time period is for example approximately 20 milliseconds per step for one-phase energization and approximately 100 milliseconds per step for two-phase energization. While energized phases are successively changed in one cycle, rotor 44 would follow the change of energized phases at any timing. Accordingly, the correspondence between the count value obtained by counter 202 and the energized phases at the end of one cycle is stored in storage unit 208. In this way, phase-matching can be done without the Z-phase signal of encoder 46.

Similarly to the first initial drive control, the second initial drive control detects an abnormality based on an amount of change of the count value obtained when the initial drive control is performed. Although the second initial drive control does not use the Z-phase signal of encoder 46, an abnormality in the Z-phase signal may be detected by the second initial drive control. If a provisional Z-phase fail flag or a provisional AB-phase fail flag has been set at storage unit 208 and the same abnormality is detected by the second initial drive control, it is confirmed that the abnormality occurs and a warning is issued to a driver through display unit 50 for example.

Figure 7:
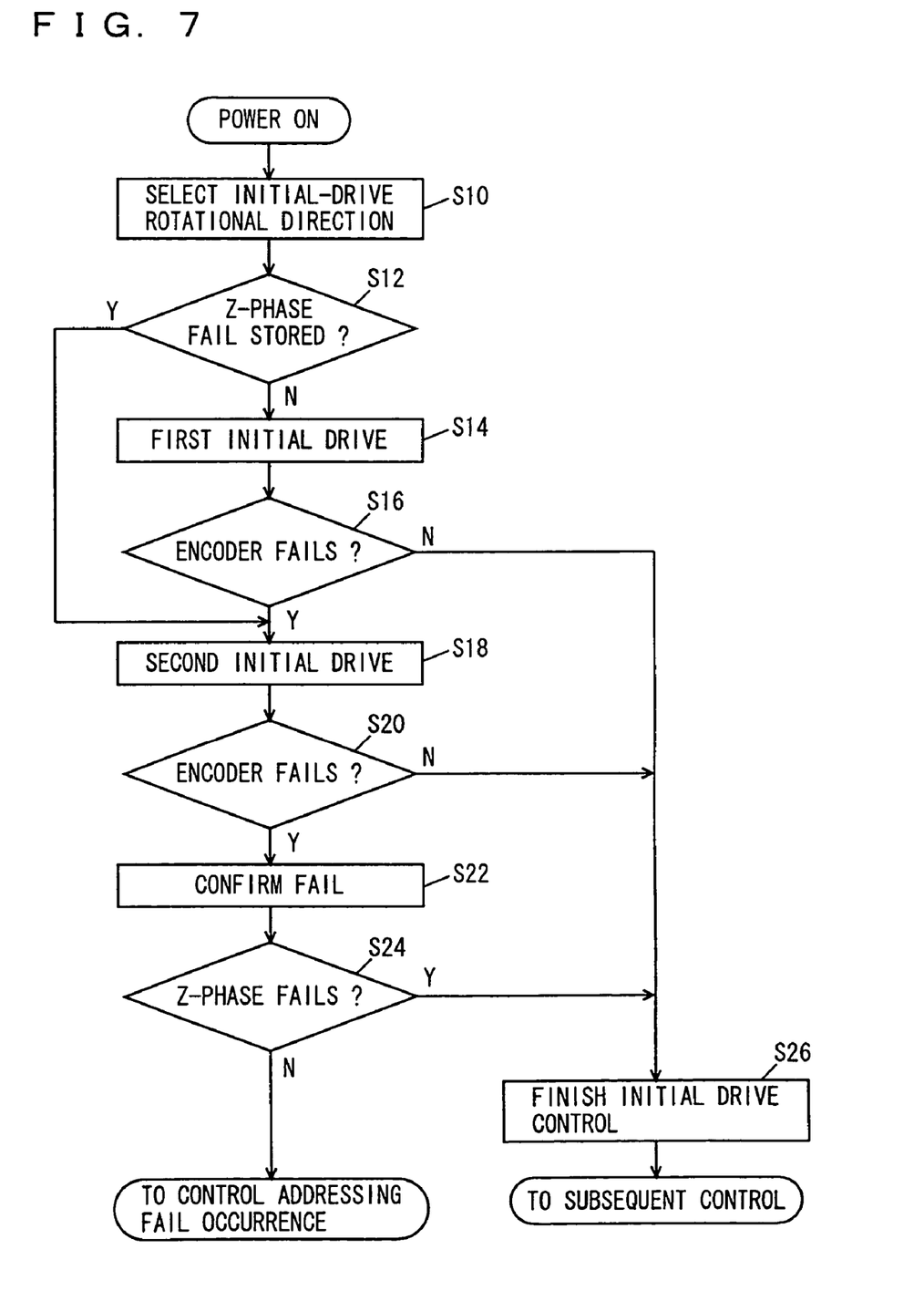
FIG. 7 is a flowchart showing a procedure of a shift control method according to the embodiment of the present invention.

FIG. 7 is a flowchart showing a procedure of a shift control method according to this embodiment. After the power of shift control system 10 is turned on, initial drive control unit 204 determines, based on a currently selected shift range, a rotational direction of encoder 46 and rotor 44 under the initial drive control (S10). If the shift range is the P range and the rotation is effected in the direction opposite to the direction for changing the shift range to the non-P range, rotation of detent plate 100 could be restricted and thus the initial drive control cannot normally be exercised. Therefore, if the current shift range is the P range, the rotation is effected in the direction for changing the P range to the non-P range and, if the current shift range is the non-P range, the rotation is effected in the direction for changing the non-P range to the P range.

The current shift range may be held in storage unit 208 or information thereabout may be given by V-ECU 30. If the current shift range is not stored, V-ECU 30 determines the current shift range based on the vehicle speed. For example, if the vehicle speed is a low speed of at most 3 km/h, V-ECU 30 determines that the current shift range is the P range and, if the vehicle speed is a medium-to-high speed higher than 3 km/h, V-ECU 30 determines that the current shift range is the non-P range. The state where the current shift range is not stored and the vehicle speed is a medium-to-high speed corresponds to a state where the power was momentarily turned off when the vehicle was running and the data on the current shift range was lost. In most cases, it is determined that the vehicle speed is a low-speed when shift control system 10 is started to operate and accordingly it is determined that the current shift range is the P range.

In the next step, it is determined whether or not storage unit 208 holds a record of fail of the Z-phase signal (S12). If there is no record indicative of an abnormality of the Z-phase signal (N in S12), first phase-matching means 210 exercises the first initial drive control (S14). If there is found a record indicative of an abnormality of the Z-phase signal (Y in S12), second phase-matching means 212 exercises the second initial drive control (S18). Since the first initial drive control takes a shorter period of time as compared with the second initial drive control, the first initial drive control is given priority in terms of its exercise and accordingly exercised unless an abnormality of the Z-phase signal occurs. The time to be consumed from the start of shift control system 10 to the time when the vehicle becomes able to run can thus be shortened.

Under the first initial drive control by first phase-matching means 210 (S14), if an abnormality of the A-phase, B-phase or Z-phase signal of encoder 46 or a rotational malfunction thereof is not detected (N in S16), the initial drive control is finished (S26) to proceed to the next control. If an abnormality is detected under the first initial drive control (Y in S16), the second initial drive control is subsequently done (S18).

Under the second initial drive control by second phase-matching means 212 (S18), if an abnormality is not detected (N in S20), the initial drive control is finished (S26) to proceed to subsequent control. If an abnormality is detected under the second initial drive control (Y in S20), it is confirmed that an abnormality occurs in encoder 46 (S22) and a warning is given to the driver through display unit 50 if necessary. Here, if the detected abnormality is an abnormality of the Z-phase signal of encoder 46 (Y in S24), the initial drive control is finished (S26) to proceed to the subsequent control for the reason that the subsequent control can normally be performed using the A-phase and B-phase signals of encoder 46. If the detected abnormality is not an abnormality of the Z-phase signal of encoder 46 (N in S24), the subsequent control cannot normally be done since the abnormality of the A-phase or the B-phase signal of encoder 46 occurs or a rotational malfunction of encoder 46 occurs. The procedure thus proceeds to any control addressing the occurrence of fail.

According to the shift control method of this embodiment, even if an abnormality is detected once, the initial drive control is done again in another way. Therefore, any possibility of erroneously detecting an abnormality and accordingly the process is ended can be reduced. Moreover, the first initial drive control is skipped and the second initial drive control is exercised when there is found a record of detection of an abnormality, so that any needless process can be eliminated to shorten the time.

The present invention has been described in connection with an embodiment thereof It would be understood by those having ordinary skill in the art that the embodiment is presented by way of example and various modifications thereof are possible for the combination of the components as well as that of process steps so that the embodiment is applicable as a rotary encoder to various types of encoders like the magnetic and optical ones and that such modifications are within the scope of the present invention.

According to this embodiment, the shift control mechanism switches the shift range between the P range and the non-P range. Alternatively, a modification of the embodiment may allow the shift control mechanism to switch the shift range between the P, R, N, D and B ranges for example.

In such a case, depressions may be provided on the top of detent plate 100 according to the number of switchable shift ranges.

According to the present invention as heretofore described, the technique of appropriately controlling a rotating body can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotating-body control device comprising:
   first phase-matching means of Z-phase detection type successively energizing a rotating body for each of a plurality of phases of the rotating body, the rotating body is rotated by the energization and resultant excitation for each of the plurality of phases, for obtaining, when a Z-phase output of an encoder detecting a rotational angle of said rotating body is rendered ON, a correspondence between a count value calculated from an output signal of said encoder and the energized phases; and
   second phase-matching means of Z-phase non-detection type successively energizing, when an abnormality in encoder output is detected under control by said first phase-matching means, the rotating body for each of said phases for a period of time in which said rotating body can rotate in accordance with the energized phases, for obtaining, when the rotating body is no longer energized, a correspondence between a count value calculated from an output signal of said encoder and the energized phases.

2. The rotating-body control device according to claim 1, further comprising abnormality detecting means for determining that an abnormality occurs in said rotating body or said encoder if an amount of change of a count value calculated from an output signal of said encoder detecting a rotational angle of said rotating body is less than a predetermined threshold value when said rotating body is being rotated.

3. The rotating-body control device according to claim 2, wherein
   said amount of change is a difference between a count value when rotation of said rotating body starts and a count value when the rotation of said rotating body ends.

4. The rotating-body control device according to claim 2, wherein
   said amount of change is a difference between a maximum value and a minimum value of the count value when said rotating body is rotating.

5. The rotating-body control device according to claim 1, wherein
   said first phase-matching means and said second phase-matching means include abnormality detecting means for determining that an abnormality occurs in said rotating body or said encoder if an amount of change of said count value when said rotating body is being rotated is less than a predetermined threshold value.

6. The rotating-body control device according to claim 5, wherein
   said amount of change is a difference between a count value when rotation of said rotating body starts and a count value when the rotation of said rotating body ends.

7. The rotating-body control device according to claim 5, wherein
   said amount of change is a difference between a maximum value and a minimum value of the count value when said rotating body is rotating.

8. A rotating-body control device comprising:
   a first phase-matching unit of Z-phase detection type successively energizing a rotating body for each of a plurality of phases of the rotating body, the rotating body is rotated by the energization and resultant excitation for each of the plurality of phases, for obtaining, when a Z-phase output of an encoder detecting a rotational angle of said rotating body is rendered ON, a correspondence between a count value calculated from an output signal of said encoder and the energized phases; and
   a second phase-matching unit of Z-phase non-detection type successively energizing, when an abnormality in encoder output is detected under control by said first phase-matching unit, the rotating body for each of said phases for a period of time in which said rotating body can rotate in accordance with energized phases, for obtaining, when the rotating body is no longer energized, a correspondence between a count value calculated from an output signal of said encoder and the energized phases.

9. The rotating-body control device according to claim 8, further comprising an abnormality detecting unit for determining that an abnormality occurs in said rotating body or said encoder if an amount of change of a count value calculated from an output signal of said encoder detecting a rotational angle of said rotating body is less than a predetermined threshold value when said rotating body is being rotated.

10. The rotating-body control device according to claim 9, wherein
    said amount of change is a difference between a count value when rotation of said rotating body starts and a count value when the rotation of said rotating body ends.

11. The rotating-body control device according to claim 9, wherein
    said amount of change is a difference between a maximum value and a minimum value of a count value when said rotating body is rotating.

12. The rotating-body control device according to claim 8, wherein
    said first phase-matching unit and said second phase-matching unit include an abnormality detecting unit for determining that an abnormality occurs in said rotating body or said encoder if an amount of change of said count value when said rotating body is being rotated is less than a predetermined threshold value.

13. The rotating-body control device according to claim 12, wherein
    said amount of change is a difference between a count value when rotation of said rotating body starts and a count value when the rotation of said rotating body ends.

14. The rotating-body control device according to claim 12, wherein
    said amount of change is a difference between a maximum value and a minimum value of the count value when said rotating body is rotating.

* * * * *